United States Patent
Kim et al.

(10) Patent No.: US 10,718,389 B2
(45) Date of Patent: Jul. 21, 2020

(54) SYSTEM AND METHOD FOR CONTROLLING ENGINE CLUTCH

(71) Applicants: HYUNDAI MOTOR COMPANY, Seoul (KR); KIA MOTORS CORPORATION, Seoul (KR)

(72) Inventors: Jong Hyun Kim, Yongin-si (KR); Tae Ho Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 15/830,756

(22) Filed: Dec. 4, 2017

(65) Prior Publication Data

US 2018/0335096 A1    Nov. 22, 2018

(30) Foreign Application Priority Data

May 22, 2017   (KR) .......................... 10-2017-0062681

(51) Int. Cl.
*F16D 48/02*    (2006.01)
*F16D 25/06*    (2006.01)
(Continued)

(52) U.S. Cl.
CPC ............. *F16D 48/02* (2013.01); *F16D 25/14* (2013.01); *B60K 6/387* (2013.01); *B60W 20/00* (2013.01);
(Continued)

(58) Field of Classification Search
CPC .............................................. F16D 2048/0251
See application file for complete search history.

(56) References Cited

U.S. PATENT DOCUMENTS

2013/0025999 A1   1/2013  Schindler et al.
2015/0258987 A1*  9/2015  Kim ....................... B60W 20/50
                                                      477/5
(Continued)

FOREIGN PATENT DOCUMENTS

GB           2458497    *  9/2009
JP      2010-038176 A      2/2010
(Continued)

OTHER PUBLICATIONS

Machine language translation of JP2010-038176.*

*Primary Examiner* — Mark A Manley
(74) *Attorney, Agent, or Firm* — Morgan, Lewis & Bockius LLP (57) ABSTRACT

A method for controlling an engine clutch includes steps of controlling the hydraulic pressure transmitted from a master cylinder, driven by a motor, to a concentric slave cylinder using a controller outputting a motor control command for controlling an engine clutch so as to switch the engine clutch to a target state, driving the engine clutch using the concentric slave cylinder, after the step of controlling hydraulic pressure, detecting a position of a piston of the master cylinder using a first travel sensor and detecting a position of a piston of the concentric slave cylinder using a second travel sensor, and performing compensation control with respect to the motor based on the positions of the pistons detected by the first travel sensor and the second travel sensor using the controller so that the engine clutch is switched to the target state.

10 Claims, 4 Drawing Sheets

(51) Int. Cl.
  *B60K 6/387* (2007.10)
  *B60W 20/00* (2016.01)
(52) U.S. Cl.
  CPC ........... *B60Y 2200/92* (2013.01); *F16D 25/06* (2013.01); *F16D 2048/0212* (2013.01); *F16D 2500/1026* (2013.01); *F16D 2500/3026* (2013.01); *F16D 2500/30405* (2013.01); *F16D 2500/5018* (2013.01); *Y10S 903/914* (2013.01)

(56) References Cited

U.S. PATENT DOCUMENTS

2016/0160943 A1\* 6/2016 Karlsson ................ F16D 48/06
  701/68
2016/0195112 A1 7/2016 Dreher et al.

FOREIGN PATENT DOCUMENTS

| JP | 2013-527389 A | 6/2013 |
| JP | 2014-141180 A | 8/2014 |
| JP | 2015-537169 A | 12/2015 |
| JP | 2016-537584 A | 12/2016 |
| KR | 10-2015-0088195 A | 7/2015 |

\* cited by examiner

FIG. 1

--PRIOR ART--

FIG. 2a

--PRIOR ART--

FIG. 2b

--PRIOR ART--

FIG. 2c

--PRIOR ART--

SYSTEM AND METHOD FOR CONTROLLING ENGINE CLUTCH

CROSS-REFERENCE TO RELATED APPLICATION

This application is based on and claims under 35 U.S.C. § 119(a) the benefit of priority to Korean Patent Application No. 10-2017-0062681 filed on May 22, 2017 with the Korean Intellectual Property Office, the entire contents of which are incorporated herein by reference.

TECHNICAL FIELD

The present disclosure relates to a system and a method for controlling an engine clutch. More particularly, it relates to a system and a method for controlling an engine clutch of a hybrid electric vehicle so as to move the same to an accurate position by compensating for variation in volume of a working fluid attributable to variation in temperature.

BACKGROUND

Hybrid electric vehicles (HEVs) refer to vehicles that use two or more different kinds of power sources. In general, the HEVs are driven by an engine, which generates driving power by combusting a fuel, and a motor, which generates driving power using electric energy of a battery.

Figure 1:
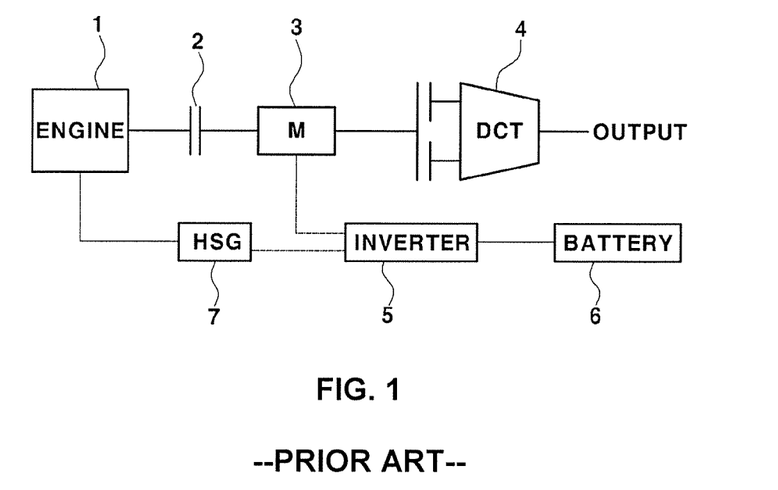
FIG. 1 is an illustrative view of a powertrain system for a general hybrid electric vehicle.

FIG. 1 is an illustrative view of a powertrain system for HEVs, particularly a transmission-mounted electric device (TMED)-type powertrain system, in which a driving motor 3 and a transmission 4 are directly connected to each other.

As shown in the drawing, in the TMED powertrain system, the transmission 4 is mounted to an output side of the driving motor 3 for vehicle traveling so that the output shaft of the motor is connected to the input shaft of the transmission, and accordingly, the speed of the motor becomes the input speed of the transmission.

Specifically, a TMED hybrid electric vehicle includes an engine 1 and a motor 3, which are power sources for driving the vehicle, an engine clutch 2 disposed between the engine 1 and the motor 3, a transmission 4 connected to the output side of the motor 3, an inverter 5 for driving the motor 3, and a battery 6, which serves as a power source (an electric power source) for the motor 3 and is connected to the motor 3 via the inverter 5 for charging or discharging.

Reference numeral 7 in FIG. 1 denotes a hybrid starter and generator (HSG), which is a kind of motor, connected to the engine 1 for transmitting power for starting the engine or generating electric power using rotational force transmitted from the engine.

The HSG 7 operates as a motor or a generator, and is connected to the engine via a power transmission device, such as a belt, a pulley, etc., such that power can be transmitted at all times.

The engine clutch 2 transmits or interrupts power between the engine 1 and the motor 3 through an engagement (closing) operation or disengagement (opening) operation thereof. The inverter 5 converts direct current of the battery 6 into three-phase alternating current and applies the same to the motor 3 to drive the motor 3 and the HSG 7.

The transmission 4 transmits the power of the motor 3 or the combined power of the engine 1 and the motor 3 to driving wheels while performing gear shifting. In hybrid electric vehicles, the transmission may be embodied as an automatic transmission (AT) or a dual-clutch transmission (DCT).

The hybrid electric vehicle having the above construction may be driven in an electric-vehicle (EV) mode, which is a pure electric-vehicle mode using only the power of the motor 3, or a hybrid-electric-vehicle (HEV) mode, which uses the power of both the engine 1 and the motor 3.

Further, when the vehicle is braking or coasting by inertia, it may be driven in a regenerative-braking mode for charging the battery (charged by the motor) by collecting kinetic energy of the vehicles through the motor 3.

In the regenerative-braking mode, the motor 3, which receives the kinetic energy of the vehicles, generates electric power and charges the battery 6, which is connected thereto via the inverter 5.

Along with this operation, when the HSG 7 operates as a generator, it charges the battery 6 via the inverter 5.

Meanwhile, in order to transfer between the EV mode and the HEV mode, the engine clutch 2, which transmits or interrupts power between the engine 1 and the motor 3, is controlled so as to be converted into an engaged (closed) state or a disengaged (open) state.

For example, when the driving mode is switched from the EV mode to the HEV mode, the speed of the engine 1 and the speed of the motor 3 are synchronized, and the engine clutch 2 is engaged after the synchronization, whereby torque variation is prevented from occurring in the process of transmitting power between the two different power sources, namely the engine 1 and the motor 3, and consequently, drivability can be secured.

Specifically, when the driving mode is switched from the EV mode to the HEV mode, after the engine cranking is performed by the HSG 7, the speeds of the two opposite ends of the engine clutch 2, that is, the speed of the engine 1 and the speed of the motor 3, are controlled such that the speed difference therebetween is reduced below a predetermined value, and subsequently, slip control is performed with respect to the engine clutch 2.

When a predetermined period of time has elapsed since the slip control was performed with respect to the engine clutch 2, it may be determined that the speed of the engine 1 and the speed of the motor 3 have been synchronized, and subsequently, the engine clutch 2 may be completely engaged and thereby completes the conversion into the HEV mode.

Such an engagement/disengagement operation of the engine clutch 2 is achieved by a hydraulic control actuator, which is controlled in accordance with a control command from a controller.

Further, the engagement/disengagement operation of the engine clutch 2 is achieved by supplying hydraulic pressure or stopping the supply of hydraulic pressure to a concentric slave cylinder (CSC) using a motor of the hydraulic control actuator.

The engine clutch 2 may be classified into a wet engine clutch and a dry engine clutch. Most hybrid electric vehicles employ a normally-closed-type dry clutch, which uses the aforementioned hydraulic control actuator, as an engine clutch.

Meanwhile, a working fluid, which is used for the engagement (closing) or disengagement (opening) operation of the engine clutch, is characterized in that a volume of the working fluid varies with ambient temperature. Specifically, as the temperature decreases, the volume of the working fluid decreases, and as the temperature increases, the volume of the working fluid increases.

Therefore, if variation in the volume of the working fluid that varies with temperature is not normally detected and the constituent components are not properly controlled corresponding to the variation, the engine clutch may undesirably undergo engagement or disengagement operation, which may cause physical damage to the engine clutch.

Further, when variation in the volume of the working fluid due to a sudden change in temperature occurs, responsiveness to a control command with respect to the stroke of the hydraulic control actuator and accuracy of the stroke of the concentric slave cylinder and/or the engine clutch with may be deteriorated.

Figure 2A:
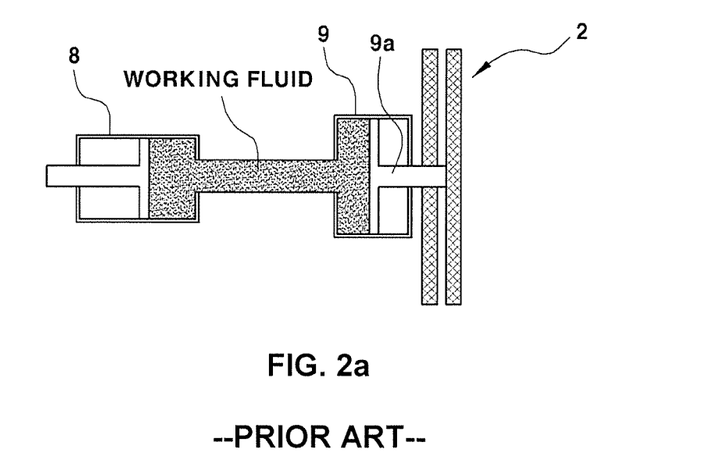
FIG. 2A to 2C are illustrative views showing states of a master cylinder, a concentric slave cylinder and an engine clutch in accordance with variations in temperature and volume of a working fluid in the prior art.
Figure 2B:
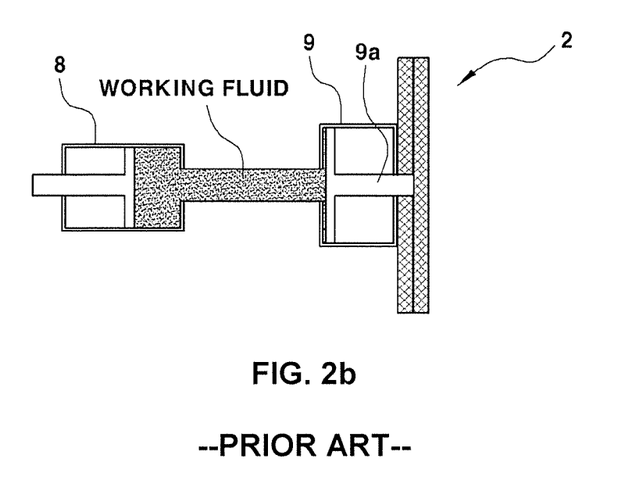
Figure 2C:
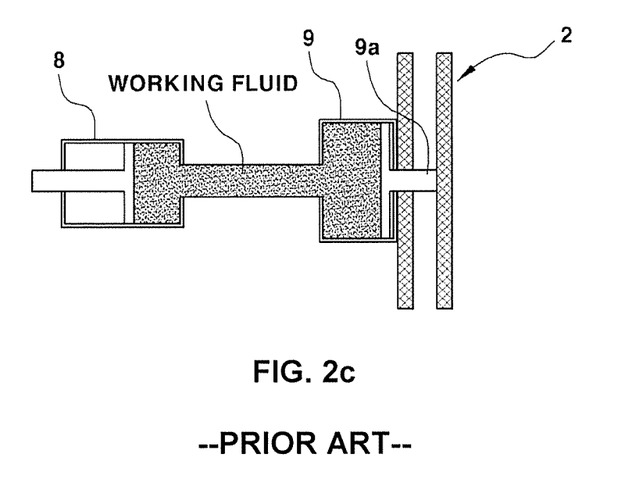

FIG. 2 is an illustrative view of the problems shown in the prior art, which illustrates the states of a master cylinder, a concentric slave cylinder and an engine clutch in accordance with variations in temperature and volume of the working fluid.

FIG. 2A illustrates an open (disengaged) state of the engine clutch 2, in which a motor (not shown) is driven to make the master cylinder 8 generate hydraulic pressure and in which the piston 9a of the concentric slave cylinder 9 is moved by the hydraulic pressure.

In particular, the state of the engine clutch shown in FIG. 2A is the normally controlled state. In other words, in the normal case, the engine clutch 2 is controlled so as to be switched to the state shown in FIG. 2A in response to a control command with respect to the actuator.

If the temperature of the working fluid is relatively low, as shown in FIG. 2B, the volume of the working fluid decreases, and the engine clutch 2 is pushed less compared to the case of normal operation by the piston 9a of the concentric slave cylinder 9, whereby the engine clutch 2 is switched to a slip state or a closed (engaged) state, rather than the normal state in FIG. 2A, which may cause damage to the engine clutch.

Conversely, if the temperature of the working fluid is relatively high, as shown in FIG. 2C, the volume of the working fluid increases, and the engine clutch 2 is pushed further than in the case of normal operation by the piston 9a of the concentric slave cylinder 9, whereby the engine clutch 2 is switched to an excessively open state, which is wider than the normal state in FIG. 2A.

However, hydraulic pressure compensation control and actuator control technologies, which enable the engagement/disengagement operation of the engine clutch to be accurately performed in consideration of variation in the volume of the working fluid attributable to variation in temperature, have not been developed.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a system and a method for controlling an engine clutch of a hybrid electric vehicle so as to switch the same to an accurate position by compensating for variation in the volume of a working fluid attributable to variation in temperature.

In one aspect, the present disclosure provides an engine clutch control system including a motor, a power-converter for converting rotational force of the motor into rectilinear force, a master cylinder for generating controlled hydraulic pressure for driving an engine clutch through forward and backward movement of a piston thereof using the rectilinear force transmitted from the power-converter, a first travel sensor mounted to the master cylinder to detect a position of the piston of the master cylinder, a concentric slave cylinder for driving the engine clutch through forward and backward movement of a piston thereof using the hydraulic pressure transmitted from the master cylinder, a second travel sensor mounted to the concentric slave cylinder to detect a position of the piston of the concentric slave cylinder, and a controller for controlling the hydraulic pressure transmitted to the concentric slave cylinder by outputting a motor control command for controlling the engine clutch so as to switch the engine clutch to a target state and additionally performing compensation control with respect to the motor based on the positions of the pistons detected by the first travel sensor and the second travel sensor.

In another aspect, the present disclosure provides an engine clutch control method including controlling the hydraulic pressure transmitted from a master cylinder, driven by a motor, to a concentric slave cylinder using a controller outputting a motor control command for controlling an engine clutch so as to switch the engine clutch to a target state, driving the engine clutch using the concentric slave cylinder, after completely controlling the hydraulic pressure, detecting a position of a piston of the master cylinder using a first travel sensor and detecting a position of a piston of the concentric slave cylinder using a second travel sensor, and performing compensation control with respect to the motor based on the positions of the pistons detected by the first travel sensor and the second travel sensor using the controller so that the engine clutch is switched to the target state.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the entire specification, when an element is referred to as "including" another element, the element should not be understood as excluding other elements, so long as there is no special conflicting description, and the element may include at least one other element.

The present disclosure provides a system and a method for controlling an engine clutch of a hybrid electric vehicle so as to switch the same to an accurate position by compensating for variation in the volume of a working fluid attributable to variation in temperature.

Figure 3:
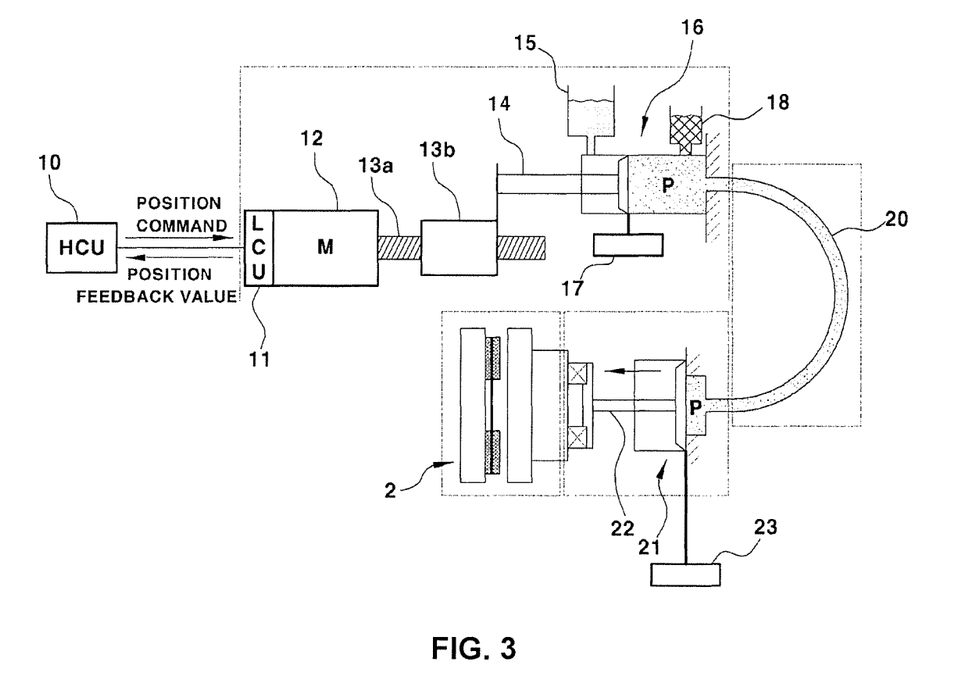
FIG. 3 is an illustrative view of an engine clutch control system according to an embodiment of the present disclosure.
Figure 4:
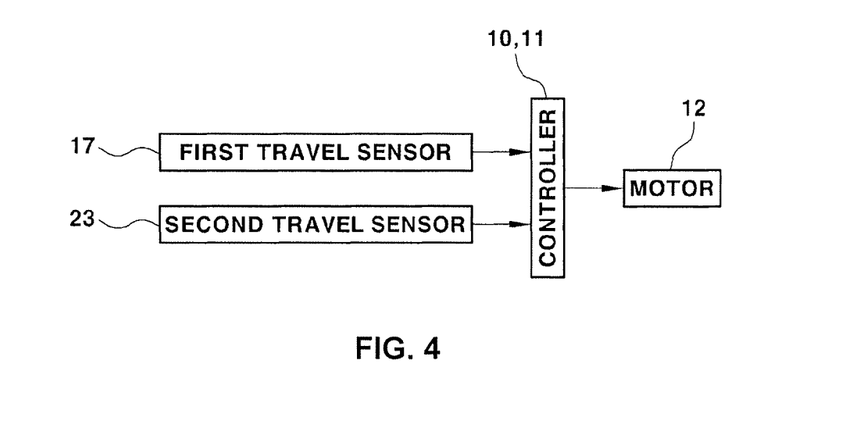
FIG. 4 is a block diagram illustrating essential components of the engine clutch control system according to the embodiment of the present disclosure.

FIG. 3 is an illustrative view of an engine clutch control system according to an embodiment of the present disclosure, and FIG. 4 is a block diagram illustrating essential components of the engine clutch control system according to the embodiment of the present disclosure.

As shown in the drawings, the engine clutch control system according to the embodiment of the present disclosure includes a hydraulic control actuator (HCA), which generates a controlled hydraulic pressure using a working fluid, a concentric slave cylinder (CSC) 21, which drives an engine clutch 2 using the controlled hydraulic pressure transmitted from the hydraulic control actuator, a controller, which controls the operation of the hydraulic control actuator, a first travel sensor 17, and a second travel sensor 23.

The hydraulic control actuator includes a motor 12, the operation of which is controlled by the controller, a power-converter, which converts the rotational force of the motor 12 into rectilinear force, and a master cylinder 16, which generates a controlled hydraulic pressure in accordance with stroke movement in the forward-and-backward direction and the controlled position of a piston 14, which receives the rectilinear force converted by the power-converter.

In this construction, the controller may include a hybrid control unit (HCU) 10, which is a high-level controller, and a local control unit (LCU) 11, which is a low-level controller.

The hybrid control unit 10, which is the high-level controller, transmits a control command to the local control unit 11, which is the low-level controller. The local control unit 11 controls the operation of the motor 12 in response to the control command transmitted from the hybrid control unit 10.

The local control unit 11 may include an inverter (not shown) in order to drive the motor 12 in accordance with the control command.

Further, the local control unit 11 transmits travel information of the master cylinder 16, which is controlled in response to the control command, that is, a position of the piston of the master cylinder 16, which is detected by the first travel sensor 17, to the hybrid control unit 10 as a feedback value.

Although it has been described above that the controller includes the high-level controller and the low-level controller, this is merely illustrative, and the disclosure is not limited thereto. In the present disclosure, the controller for controlling the operation of the hydraulic control actuator may be embodied as a single controller, in which the high-level controller and the low-level controller are integrated.

The block diagram in FIG. 4 exemplarily illustrates a single integrated controller, which may include a hybrid control unit 11, which is a high-level controller, and a local control unit 12, which is a low-level controller.

The power-converter includes a screw shaft 13a, which is rotated by the operation of the motor 12, and a movable block 13b, which is screw-engaged with the screw shaft 13a. Although not illustrated in detail, the movable block 13b is engaged with the screw shaft 13a such that it can perform only rectilinear reciprocating movement in the forward-and-backward direction along the screw shaft 13a by means of a housing (not shown) or a rectilinear movement guide element (not shown) of the hydraulic control actuator, but cannot perform rotational movement.

Further, the piston 14 of the master cylinder 16 is coupled to the movable block 13b. Therefore, when the movable block 13b performs rectilinear reciprocating movement along the screw shaft 13a in the forward-and-backward direction, the piston 14 of the master cylinder 16, which is integrally coupled to the movable block 13b, also performs rectilinear reciprocating movement in the forward-and-backward direction at the same time.

In this construction, when the motor 12 is driven while being controlled by the local control unit 11, the rotational force of the screw shaft 13a, which is a rotating shaft of the motor 12, is converted into rectilinear force by the movable block 13b, and the movable block 13b moves rectilinearly along the screw shaft 13a.

As the movable block 13b moves rectilinearly, the piston 14 of the master cylinder 16 moves rectilinearly to a predetermined target position. At this time, the pressure (the hydraulic pressure) of the working fluid is generated or released by the piston 14.

That is, as the controller controls the operation of the motor 12, the positions of the movable block 13b and the piston 14 are controlled. As the position of the piston 14 is controlled, the hydraulic pressure of the master cylinder 16 is controlled.

The master cylinder 16 is provided with sensors, such as a first travel sensor 17 for detecting the stroke position of the piston 14 and a pressure sensor 18 for detecting the pressure (the hydraulic pressure) of the working fluid.

Further, the master cylinder 16 is provided with a reservoir 15 for storing, supplying or collecting the working fluid.

The concentric slave cylinder 21 (CSC) receives the hydraulic pressure from the hydraulic control actuator, more particularly, from the master cylinder 16 of the hydraulic control actuator, and applies force to the engine clutch 2 through movement of a piston 22 thereof in the forward-and-backward direction.

To this end, a fluid pipe 20, which is filled with the working fluid to transmit the pressure of the working fluid, connects the master cylinder 16 to the concentric slave cylinder 21 so that the transmission of force for driving the engine clutch 2 is achieved through the working fluid in the fluid pipe 20.

At this time, when the hydraulic pressure generated at the master cylinder 16 is transmitted to the concentric slave cylinder 21 via the fluid pipe 20, the piston 22 of the concentric slave cylinder 21 is moved forward or backward by the hydraulic pressure transmitted via the fluid pipe 20.

As such, the position of the piston 22 of the concentric slave cylinder 21 is controlled by the hydraulic pressure transmitted via the fluid pipe 20, and the operation of the engine clutch 2 is controlled by the movement of the piston 22 in the forward-and-backward direction.

The engine clutch control system according to the embodiment of the present disclosure further includes a second travel sensor 23, which is mounted to the concentric slave cylinder 21 to detect the stroke position of the piston 22.

The controller receives electric signals output from the first travel sensor 17 and the second travel sensor 23, that is, signals indicating the position of the piston of the master cylinder 16 and the position of the piston of the concentric slave cylinder 21.

At this time, the position detection signals output from the first travel sensor 17 and the second travel sensor 23 may be transmitted to the local control unit 11, and the local control unit 11 may transmit the positions of the pistons of the two cylinders 16 and 21, which is collected through the two travel sensors 17 and 23, to the hybrid control unit 10.

Subsequently, the hybrid control unit 10 senses variation in the volume of the working fluid based on the positions of the pistons of the two cylinders 16 and 21, and performs compensation control in accordance with variation in the volume of the working fluid.

Since the component that actually drives the engine clutch 2 is the concentric slave cylinder 21, the present disclosure is constructed such that the travel sensor 23 is additionally mounted to the concentric slave cylinder 21 as well as the master cylinder 16 of the hydraulic control actuator.

Further, according to the present disclosure, after the control is completely performed with respect to the hydraulic pressure for driving the engine clutch 2, the travel of the master cylinder 16 and the travel of the concentric slave cylinder 21, that is, the positions of the pistons of the two cylinders, are measured by the first travel sensor 17 and the second travel sensor 23, variation in the volume of the working fluid attributable to variation in temperature is detected based on the measured the positions, and compensation control is performed in order to enable the engine clutch 2 to be accurately switched to a predetermined target state by compensating for variation in the volume of the working fluid.

In the present disclosure, compensation control may be performed for the hydraulic control actuator, more particularly, may be performed to compensate for the position of the piston of the master cylinder 16 so that the engine clutch 2 can be accurately switched to a predetermined target state.

Further, in the hydraulic control actuator, since the position of the piston of the master cylinder 16 is actually controlled by controlling the operation of the motor 12, the compensation may be applied to a control command for the motor 12, and compensation control may be performed such that the motor 12 is additionally driven in proportion to a compensation value.

Here, the compensation value may be calculated based on the positions of the pistons of the two cylinders 16 and 21, which reflects the degree of variation in the volume of the working fluid.

Further, the actual operation of the motor 12 is controlled by controlling the electric current applied to the motor 12, and accordingly, compensation control may be performed to compensate for the electric current applied to the motor 12 in proportion to a compensation value.

Figure 5:
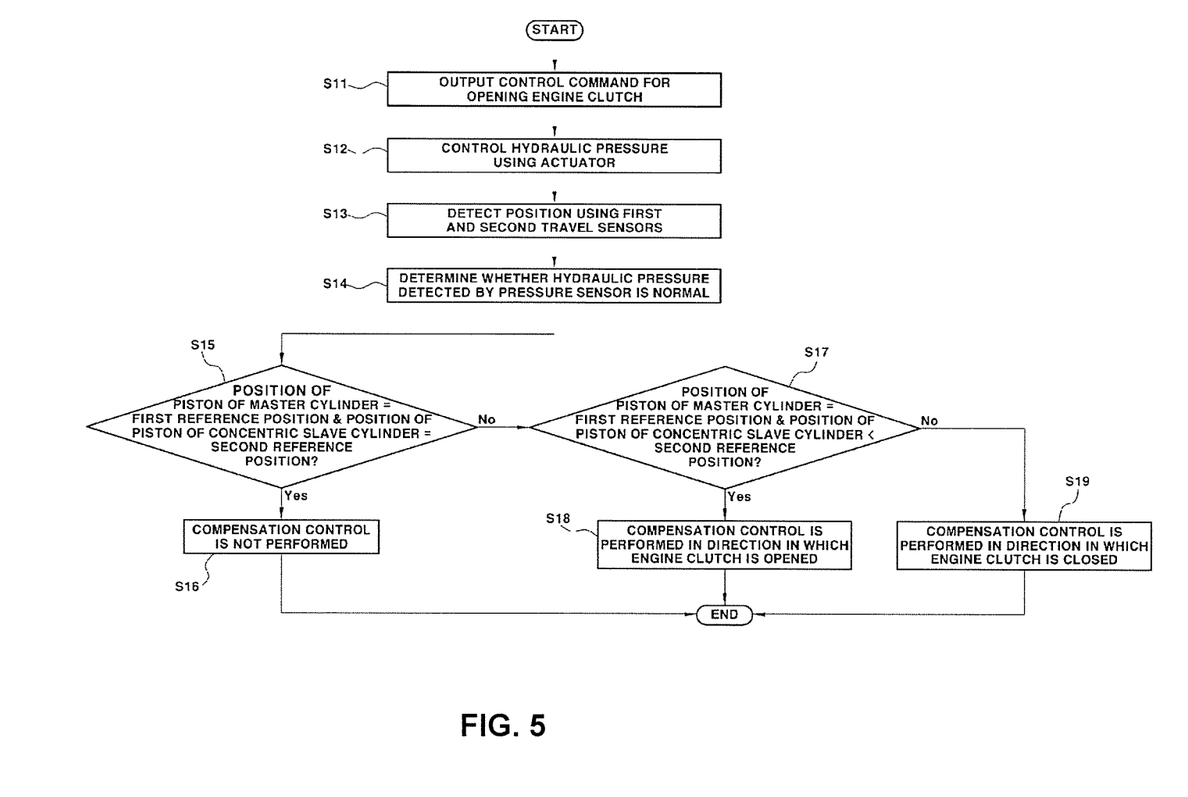
FIG. 5 is a flowchart illustrating an engine clutch control method according to an embodiment of the present disclosure.

FIG. 5 is a flowchart illustrating an engine clutch control method according to an embodiment of the present disclosure. Hereinafter, the engine clutch control method according to the embodiment of the present disclosure will be described in detail with reference to FIG. 5.

According to the present disclosure, the travel of the master cylinder 16 is controlled using the motor 12 of the hydraulic control actuator, and the travel of the concentric slave cylinder 21 is controlled so as to prevent the engine clutch 2 from being physically damaged.

To this end, the engine clutch control method according to the embodiment of the present disclosure includes a step of controlling the hydraulic pressure transmitted from the master cylinder, which is driven by the motor, to the concentric slave cylinder using the controller outputting a motor control command for controlling the engine clutch so as to switch the same to a target state, a step of driving the engine clutch using the concentric slave cylinder, a step of, after completely controlling the hydraulic pressure, detecting the position of the piston of the master cylinder using the first travel sensor and detecting the position of the piston of the concentric slave cylinder using the second travel sensor, and a step of performing compensation control with respect to the motor based on the positions of the pistons detected by the first travel sensor and the second travel sensor using the controller so that the engine clutch is switched to the target state.

First, the hybrid control unit 10, which is the high-level controller, outputs a control command for opening (disengaging) the engine clutch 2 to the hydraulic control actuator (S11). At this time, the control command value for controlling the engine clutch 2 so as to switch the same to an open position is a predetermined arbitrary value that makes the engine clutch 2 open at a specific reference temperature of the working fluid.

The operation of the hydraulic control actuator (i.e. the operation of the motor) is controlled in accordance with the control command output from the hybrid control unit 10. In this way, the control is performed with respect to the supply of hydraulic pressure for opening the engine clutch 2 (S12).

That is, the local control unit 11, which is the low-level controller, controls the operation of the motor 12 in response to the control command transmitted from the hybrid control unit 10. In accordance with the operation of the motor 12, the controlled hydraulic pressure, which makes the piston 14 of the master cylinder 16 move forward to open the engine clutch 2, is generated.

The control command value is a predetermined command value for controlling the motor 12 such that the piston of the master cylinder 16 reaches a second reference position, which will be described later, under the condition that the temperature of the working fluid is a reference temperature. At this time, the second reference position is a position of the piston of the master cylinder 16 at which the engine clutch 2 is switched to a target open position.

Subsequently, after the control is completely performed with respect to the hydraulic pressure for opening the engine clutch 2, the positions of the pistons are detected by the travel sensors 17 and 23 (S13).

Described in detail, the travel of the master cylinder 16, that is, the position of the piston of the master cylinder 16, is detected by the first travel sensor 17, the detection signal from the first travel sensor 17 is input to the local control unit 11, and the local control unit 11 transmits the detected position of the piston of the master cylinder 16 to the hybrid control unit 10.

Along with this, the travel of the concentric slave cylinder 21, that is, the position of the piston of the concentric slave cylinder 21, is detected by the second travel sensor 23, the detection signal from the second travel sensor 23 is input to the local control unit 11, and the local control unit 11 transmits the detected position of the piston of the concentric slave cylinder 21 to the hybrid control unit 10.

Subsequently, the local control unit 11 receives the detection signal from the pressure sensor 18, which is mounted to the master cylinder 16, and determines whether the detected hydraulic pressure is within a predetermined normal range (S14).

The embodiment may alternatively be constructed such that the local control unit 11 receives the detection signal from the pressure sensor 18 and transmits the detected hydraulic pressure to the hybrid control unit 10 and the hybrid control unit 10 determines whether the detected hydraulic pressure is within a predetermined normal range.

As described above, after the control is completely performed with respect to the hydraulic pressure by the hydraulic control actuator, the controlled hydraulic pressure is transmitted from the master cylinder 16 to the concentric slave cylinder 21 via the fluid pipe 20, and accordingly, the piston 22 of the concentric slave cylinder 21 moves.

At this time, since the hydraulic pressure for opening the engine clutch 2 is being controlled, the piston 22 of the concentric slave cylinder 21 moves in the direction in which the engine clutch 2 is opened. Specifically, the piston 22 moves forward and pushes the clutch plate of the engine clutch 2, which is of a normally-closed type.

According to the present disclosure, as described above, in the state in which the piston 22 of the concentric slave cylinder 21 is moved by the hydraulic pressure transmitted from the master cylinder 16 of the hydraulic control actuator via the fluid pipe 20, the travel of the concentric slave cylinder 21, that is, the position of the piston 22 of the concentric slave cylinder 21, which is detected by the second travel sensor 23, is used for the control.

To this end, when the detection signal from the second travel sensor 23 is input to the local control unit 11, the local control unit 11 transmits the detected position of the piston of the concentric slave cylinder 21 to the hybrid control unit 10.

If the hydraulic pressure, which is detected by the pressure sensor 18, is within a normal range, the hybrid control unit 10 or the local control unit 11 determines whether variation in the volume of the working fluid has occurred based on the positions of the pistons, which are detected by the travel sensors 17 and 23.

Here, variation in the volume of the working fluid is caused by a change in the temperature of the working fluid from the aforementioned specific reference temperature.

The position of the piston of the master cylinder 16, which is detected by the first travel sensor 17, is not influenced by variation in the volume of the working fluid, but is determined by the motor control command and the extent of operation of the motor 12 in response thereto.

Therefore, unless the sensors are out of order or malfunction, the position of the piston of the master cylinder 16, which is detected by the first travel sensor 17, must become the reference position corresponding to the aforementioned control command value for opening the engine clutch 2.

If the temperature of the working fluid is not changed from the reference temperature, the volume of the working fluid is also not changed from the volume corresponding to the reference temperature. When the temperature of the working fluid is maintained at the reference temperature, the position of the piston of the master cylinder 16 and the position of the piston of the concentric slave cylinder 21 are set as specific position values, which have a specific relationship therebetween and correspond to the reference temperature.

It is determined whether variation in the volume of the working fluid has occurred by comparing the position values detected by the travel sensors 17 and 23 with the foregoing specific position values.

To this end, the foregoing specific position values are stored in the hybrid control unit 10 or the local control unit 11, which determines the occurrence of variation in the volume of the working fluid.

That is, when the working fluid is at the reference temperature and has a volume corresponding to the reference temperature, the position of the piston of the master cylinder 16 is defined as a second reference position, and the position of the piston of the concentric slave cylinder 21 is defined as a first reference position. These first and second reference positions are stored in the controller.

If the temperature of the working fluid is changed from the reference temperature, the volume of the working fluid may also change, i.e. may increase or decrease, from the volume corresponding to the reference temperature.

Therefore, the hybrid control unit 10 or the local control unit 11 compares the position of the piston of the master cylinder 16 detected by the first travel sensor 17 with the second reference position and compares the position of the piston of the concentric slave cylinder 21 detected by the second travel sensor 23 with the first reference position, thereby determining whether a change in the position of the piston has occurred.

The second reference position and the first reference position are respectively the position of the piston of the master cylinder 16 and the position of the piston of the concentric slave cylinder 21 for opening the engine clutch 2 to a target position, and are stored in advance in the controller (the hybrid control unit or the local control unit).

Based on the comparison results, if it is determined that the detected position of the piston of the master cylinder 16 has not been changed from the second reference position and it is also determined that the detected position of the piston of the concentric slave cylinder 21 has not been changed from the first reference position, the controller does not perform compensation control with respect to the hydraulic control actuator (S15).

Here, if there is no change in the position of the piston, it represents no difference between the detected position of the piston of the master cylinder 16 and the second reference position and between the detected position of the piston of the concentric slave cylinder 21 and the first reference position.

However, based on the comparison results, if it is determined that the detected position of the piston of the master cylinder 16 has not been changed from the second reference position and it is determined that the detected position of the piston of the concentric slave cylinder 21 has been changed from the first reference position, the controller performs compensation control with respect to the hydraulic control actuator such that the hydraulic control actuator is additionally controlled in proportion to a compensation value, which corresponds to the difference between the position of the piston of the concentric slave cylinder 21 and the first reference position (S17 to S19).

That is, the controller determines the compensation value corresponding to the difference between the position of the piston of the concentric slave cylinder 21 and the first reference position, and additionally controls the motor 12 of the actuator in proportion to the compensation value in order to open the engine clutch 2 to a target position.

At this time, the controller may be set to perform compensation control only when the detected position of the piston of the concentric slave cylinder 21 is spaced a predetermined distance or more away from the first reference position, that is, when the difference between the position of the piston of the concentric slave cylinder 21 and the first reference position is equal to or greater than the predetermined distance.

Further, if it is determined that the detected position of the piston of the concentric slave cylinder 21 has not reached the first reference position, in order to open the engine clutch 2 to a target position, the piston 22 of the concentric slave cylinder 21 is additionally moved to the first reference position in the direction in which the engine clutch 2 is opened, that is, in the (+) direction, in which the piston moves forward (the direction in which the position value of the piston of the concentric slave cylinder 21 increases) (S17 and S18).

Therefore, a compensation value in the (+) direction, which corresponds to the difference between the detected position of the piston of the concentric slave cylinder 21 and the first reference position, is determined, and the hydraulic control actuator (the motor) is additionally controlled in proportion to the compensation value in the (+) direction so as to compensate for variation in the volume of the working fluid, whereby it is possible to open the engine clutch 2 to a target position (the open clutch gap is maintained constant) (S18).

Conversely, if it is determined that the detected position of the piston of the concentric slave cylinder 21 has exceeded the first reference position, in order to open the engine clutch 2 to a target position, the piston 22 of the concentric slave cylinder 21 is additionally moved to the first reference position in the direction in which the engine clutch 2 is closed, that is, in the (−) direction, in which the piston moves backward (the direction in which the position value of the piston of the concentric slave cylinder 21 decreases) (S17 and S19).

Therefore, a compensation value in the (−) direction, which corresponds to the difference between the detected position of the piston of the concentric slave cylinder 21 and the first reference position, is determined, and the hydraulic control actuator (the motor) is additionally controlled in proportion to the compensation value in the (−) direction so as to compensate for variation in the volume of the working fluid, whereby it is possible to open the engine clutch 2 to a target position (the open clutch gap is maintained constant) (S19).

Meanwhile, although it has been described above that compensation control is performed in the process of opening (disengaging) the engine clutch, compensation control may alternatively be performed in a similar way in the process of closing (engaging) the engine clutch or switching the engine clutch from an open position to a slip position, rather than in the process of opening the engine clutch.

In this case, there is a difference in that compensation control is performed when the engine clutch is controlled so as to be switched to a closed position or a slip position, rather than to an open position, and in that the hybrid control unit 10, which is the high-level controller, outputs a control command for closing the engine clutch 2 or a control command for switching the engine clutch 2 to a slip position to the hydraulic control actuator.

Described in more detail, the hybrid control unit 10 outputs, to the hydraulic control actuator, a control command for controlling the engine clutch 2 so as to switch the same to a closed position or a slip position. At this time, the control command value is a predetermined arbitrary value that controls the engine clutch 2 so as to switch the same to a target closed position or a target slip position at a specific reference temperature of the working fluid.

The operation of the hydraulic control actuator (i.e. the operation of the motor) is controlled in accordance with the control command output from the hybrid control unit 10. In this way, control is performed with respect to the supply of hydraulic pressure for closing or slipping the engine clutch 2.

Further, after the hydraulic pressure control is completed, the position of the piston of the master cylinder 16 is detected by the first travel sensor 17, the hydraulic pressure is detected by the pressure sensor 18 mounted to the master cylinder 16, and the position of the piston of the concentric slave cylinder 21 is detected by the second travel sensor 23.

Further, the hybrid control unit 10 determines whether the hydraulic pressure detected by the pressure sensor 18 is within a predetermined normal range. If the detected hydraulic pressure is within a normal range, the hybrid control unit 10 or the local control unit 11 determines whether variation in the volume of the working fluid has occurred based on the positions of the pistons, which are detected by the travel sensors 17 and 23.

That is, the hybrid control unit 10 or the local control unit 11 compares the position of the piston of the master cylinder 16 detected by the first travel sensor 17 with the second reference position and compares the position of the piston of the concentric slave cylinder 21 detected by the second travel sensor 23 with the first reference position, thereby determining whether a change in the position of the piston has occurred.

Here, the second reference position and the first reference position are respectively the position of the piston of the master cylinder 16 and the position of the piston of the concentric slave cylinder 21 for closing or slipping the engine clutch 2 to a target position, and are stored in advance in the controller (the hybrid control unit or the local control unit).

Based on the comparison results, if it is determined that the detected position of the piston of the master cylinder 16 has not been changed from the second reference position and it is also determined that the detected position of the piston of the concentric slave cylinder 21 has not been changed from the first reference position, the controller does not perform compensation control with respect to the hydraulic control actuator.

However, based on the comparison results, if it is determined that the detected position of the piston of the master cylinder 16 has not been changed from the second reference position and it is determined that the detected position of the piston of the concentric slave cylinder 21 has been changed from the first reference position, the controller performs compensation control with respect to the hydraulic control actuator such that the hydraulic control actuator is additionally controlled in proportion to a compensation value, which corresponds to the difference between the position of the piston of the concentric slave cylinder 21 and the first reference position.

That is, the controller determines the compensation value corresponding to the difference between the position of the piston of the concentric slave cylinder 21 and the first reference position, and additionally controls the motor 12 of the actuator in proportion to the compensation value in order to control the engine clutch 2 so as to switch the same to a target state.

At this time, the controller may be set to perform compensation control only when the detected position of the piston of the concentric slave cylinder 21 is spaced a predetermined distance or more away from the first reference position, that is, when the difference between the position of the piston of the concentric slave cylinder 21 and the first reference position is equal to or greater than the predetermined distance.

Further, if it is determined that the detected position of the piston of the concentric slave cylinder 21 has not reached the first reference position, the piston 22 of the concentric slave cylinder 21 is additionally moved to the first reference position in the direction in which the engine clutch 2 is opened, that is, in the (+) direction, in which the piston moves forward (the direction in which the position value of the piston of the concentric slave cylinder 21 increases).

Therefore, a compensation value in the (+) direction, which corresponds to the difference between the detected position of the piston of the concentric slave cylinder 21 and the first reference position, is determined, and the hydraulic control actuator (the motor) is additionally controlled in proportion to the compensation value in the (+) direction so as to compensate for variation in the volume of the working fluid, whereby it is possible to switch the engine clutch 2 to a target closed position or a target slip position.

Conversely, if it is determined that the detected position of the piston of the concentric slave cylinder 21 has exceeded the first reference position, the piston 22 of the concentric slave cylinder 21 is additionally moved to the first reference position in the direction in which the engine clutch 2 is closed, that is, in the (−) direction, in which the piston moves backward (the direction in which the position value of the piston of the concentric slave cylinder 21 decreases).

Therefore, a compensation value in the (−) direction, which corresponds to the difference between the detected position of the piston of the concentric slave cylinder 21 and the first reference position, is determined, and the hydraulic control actuator (the motor) is additionally controlled in proportion to the compensation value in the (−) direction so as to compensate for variation in the volume of the working fluid, whereby it is possible to switch the engine clutch 2 to a target closed position or a target slip position.

As is apparent from the above description, in a system and a method for controlling an engine clutch according to the present disclosure, a position (travel) of a piston of a concentric slave cylinder, which actually drives an engine clutch, is detected and compared with a reference position, and compensation control is performed with respect to a hydraulic control actuator in proportion to a compensation value, which corresponds to a difference between the position of the piston and the reference position, thereby controlling the engine clutch so as to switch the same to an accurate position in response to variation in the volume of a working fluid attributable to variation in temperature, enabling more precise control of the engine clutch, and preventing the engine clutch from being physically damaged due to inaccurate control.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling an engine clutch, comprising:
   a motor;
   a power-converter for converting rotational force of the motor into rectilinear force;
   a master cylinder for generating controlled hydraulic pressure for driving an engine clutch through forward and backward movement of a piston thereof using the rectilinear force transmitted from the power-converter;
   a first travel sensor mounted to the master cylinder and configured to detect a position of the piston of the master cylinder;
   a slave cylinder for driving the engine clutch through forward and backward movement of a piston thereof using the hydraulic pressure transmitted from the master cylinder;
   a second travel sensor mounted to the slave cylinder and configured to detect a position of the piston of the slave cylinder; and
   a controller configured to control hydraulic pressure transmitted to the slave cylinder by outputting a motor control command for controlling the engine clutch so as to switch the engine clutch to a target state and to additionally perform compensation control with respect to the motor based on the positions of the pistons detected by the first travel sensor and the second travel sensor,
   wherein the controller compares a position of the piston of the slave cylinder, detected by the second travel sensor, with a first reference position for performing control so that the engine clutch is in a target state, determines a compensation value corresponding to a difference between the detected position of the piston of the slave cylinder and the first reference position, and performs compensation control with respect to the motor in proportion to the determined compensation value, wherein the compensation value reflects a degree of variation in a volume of a working fluid,
   wherein the controller compares a position of the piston of the master cylinder, detected by the first travel sensor, with a second reference position for performing control so that the engine clutch is in a target state, and
   if there is no difference between the detected position of the piston of the master cylinder and the second reference position, the controller determines the compensation value and performs the compensation control with respect to the motor.

2. The system of claim 1, wherein the first reference position and the second reference position are respectively a position of the piston of the slave cylinder and a position of the piston of the master cylinder for performing control so that the engine clutch is in a target state when a working fluid is at a predetermined reference temperature, and are stored in advance in the controller.

3. The system of claim 1, wherein the target state is an open state of the engine clutch, and
   if the detected position of the piston of the slave cylinder has not reached the first reference position, the controller performs compensation control with respect to the motor such that the piston of the slave cylinder is additionally moved to the first reference position.

4. The system of claim 1, wherein the target state is an open state of the engine clutch, and
   if the detected position of the piston of the slave cylinder has exceeded the first reference position, the controller performs compensation control with respect to the motor such that the piston of the slave cylinder is moved back to the first reference position.

5. The system of claim 1, wherein, if hydraulic pressure, detected by a pressure sensor mounted to the master cylinder, is within a predetermined normal range, the controller performs compensation control with respect to the motor.

6. A method for controlling an engine clutch, comprising steps of:
   controlling hydraulic pressure transmitted from a master cylinder, driven by a motor, to a slave cylinder using a controller outputting a motor control command for controlling an engine clutch so as to switch the engine clutch to a target state;
   driving the engine clutch using the slave cylinder;
   after the step of controlling hydraulic pressure, detecting a position of a piston of the master cylinder using a first travel sensor and detecting a position of a piston of the slave cylinder using a second travel sensor; and
   performing compensation control with respect to the motor based on the positions of the pistons detected by the first travel sensor and the second travel sensor using the controller so that the engine clutch is switched to the target state,
   wherein the controller compares a position of the piston of the slave cylinder, detected by the second travel sensor, with a first reference position for performing control so that the engine clutch is in a target state, determines a compensation value corresponding to a difference between the detected position of the piston of the slave cylinder and the first reference position, and performs compensation control with respect to the motor in proportion to the determined compensation value, wherein the compensation value reflects a degree of variation in a volume of a working fluid,
   wherein the controller compares a position of the piston of the master cylinder, detected by the first travel sensor, with a second reference position for performing control so that the engine clutch is in a target state, and
   if there is no difference between the detected position of the piston of the master cylinder and the second reference position, the controller determines the compensation value and performs the compensation control with respect to the motor.

7. The method of claim 6, wherein the first reference position and the second reference position are respectively a position of the piston of the slave cylinder and a position of the piston of the master cylinder for performing control so that the engine clutch is in a target state when a working fluid is at a predetermined reference temperature, and are stored in advance in the controller.

8. The method of claim 6, wherein the target state is an open state of the engine clutch, and
   if the detected position of the piston of the slave cylinder has not reached the first reference position, the controller performs compensation control with respect to the motor such that the piston of the slave cylinder is additionally moved to the first reference position.

9. The method of claim 6, wherein the target state is an open state of the engine clutch, and
   if the detected position of the piston of the slave cylinder has is different from the first reference position, the controller performs compensation control with respect to the motor such that the piston of the slave cylinder is moved back to the first reference position.

10. The method of claim 6, wherein, if hydraulic pressure, detected by a pressure sensor mounted to the master cylinder, is within a predetermined normal range, the controller performs compensation control with respect to the motor.

* * * * *